Oct. 24, 1961  A. ORNER  3,005,632
CARD PROCESSING APPARATUS
Filed July 24, 1959  4 Sheets-Sheet 3
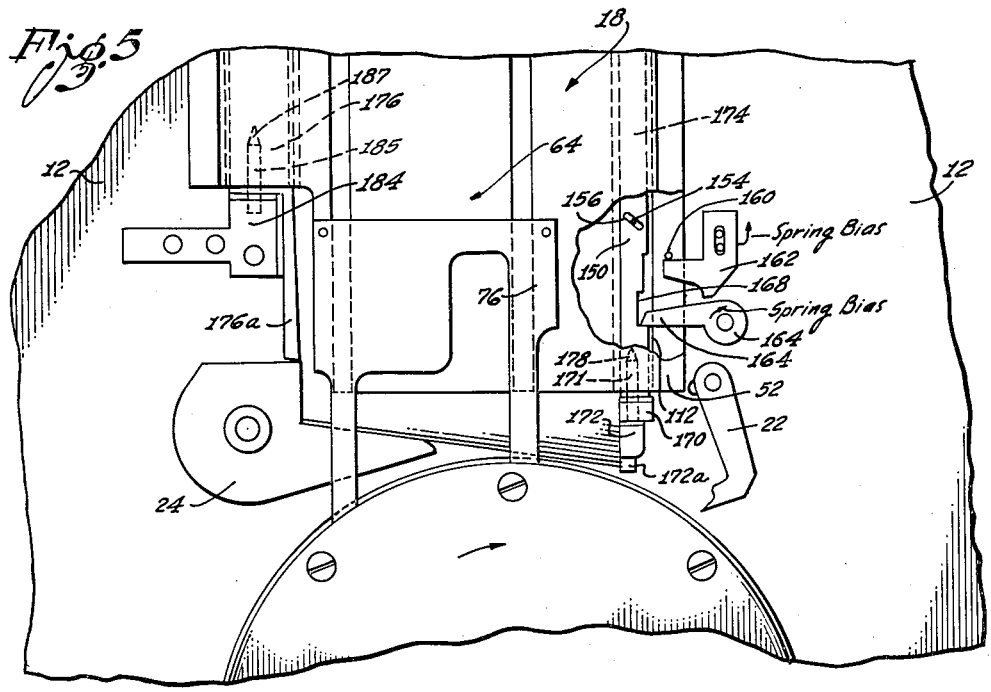
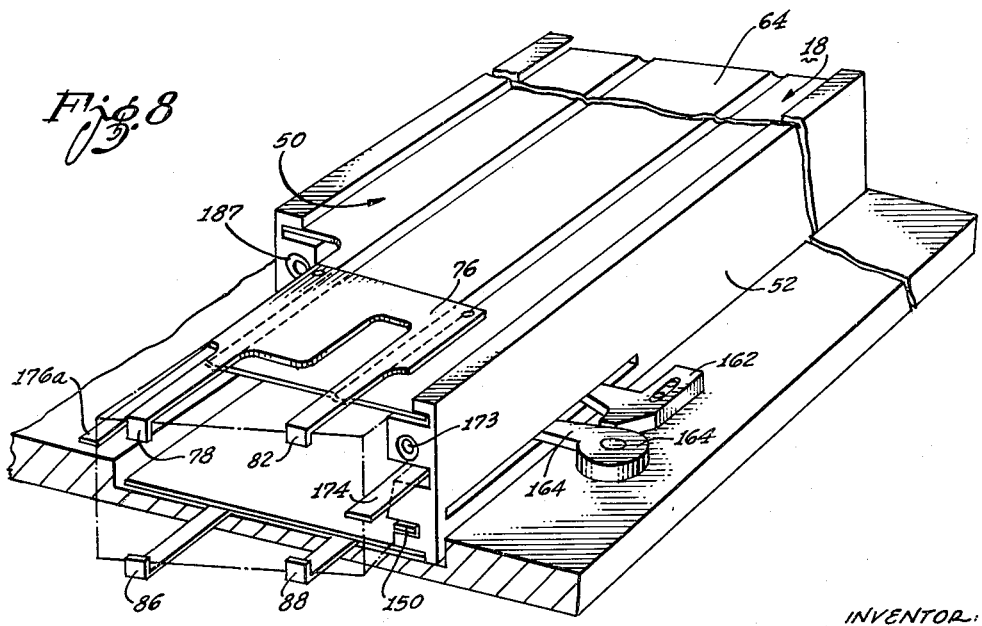
INVENTOR:
Allan Orner Oct. 24, 1961 A. ORNER 3,005,632
CARD PROCESSING APPARATUS
Filed July 24, 1959 4 Sheets-Sheet 4
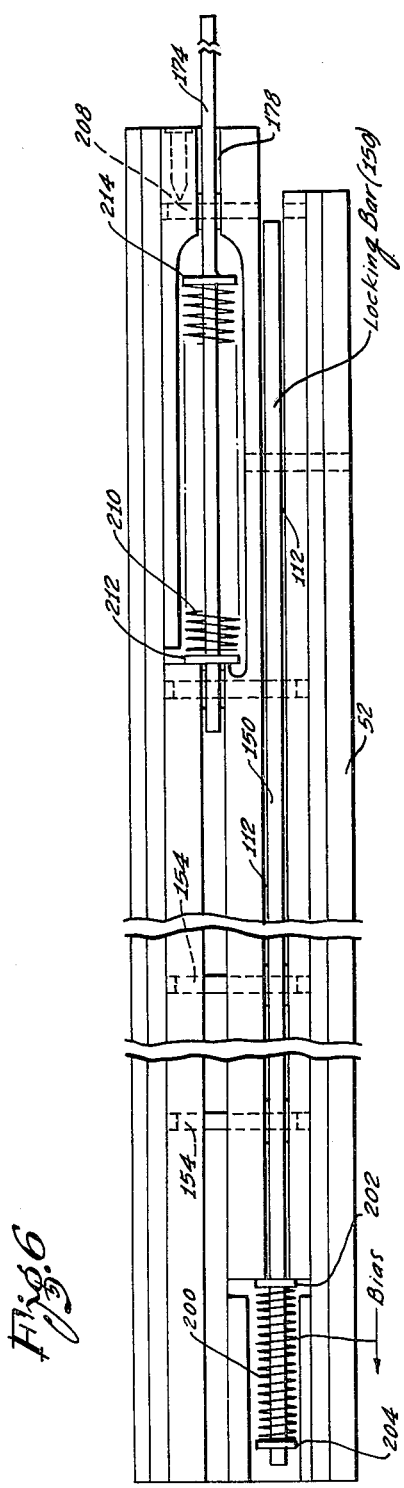
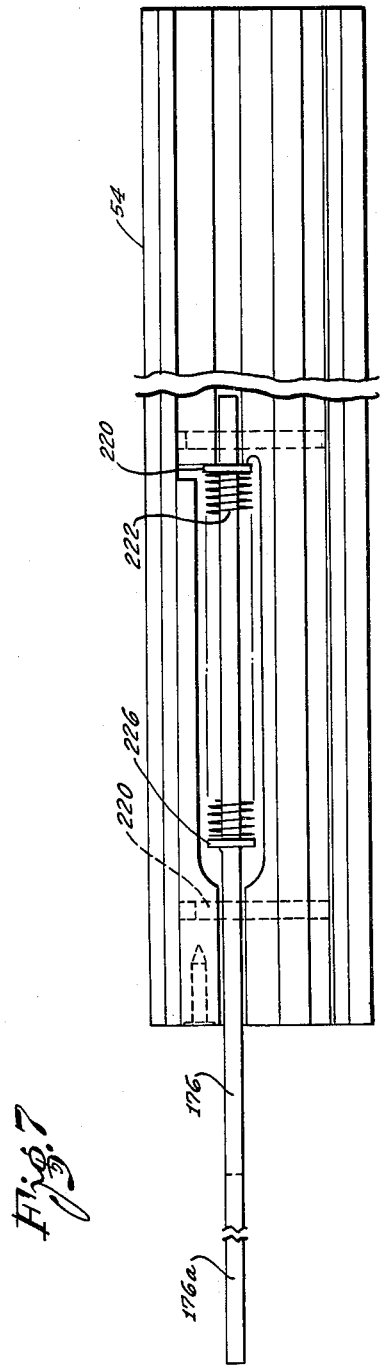
INVENTOR:
Allan Orner
Attorneys,

United States Patent Office 3,005,632
Patented Oct. 24, 1961

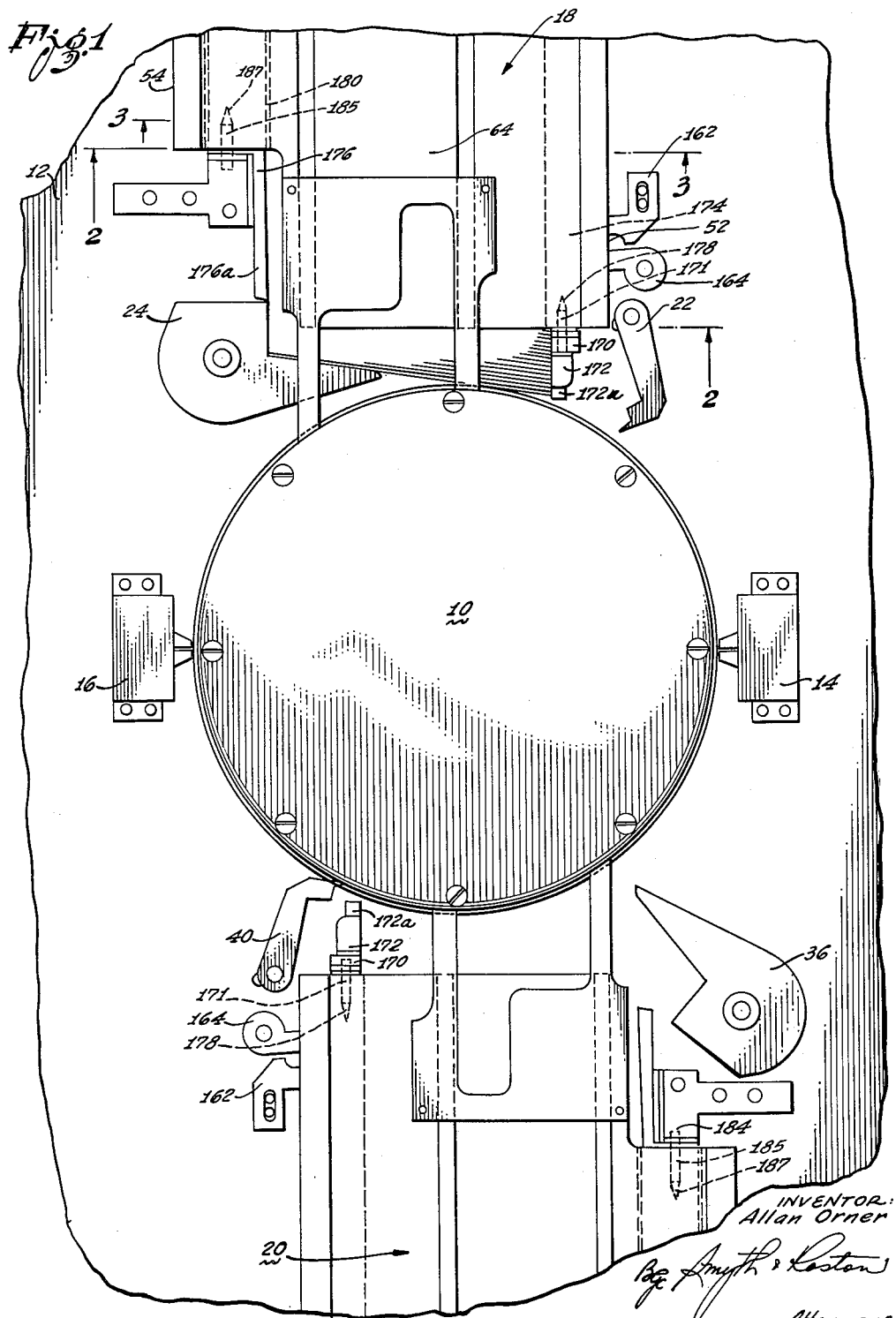

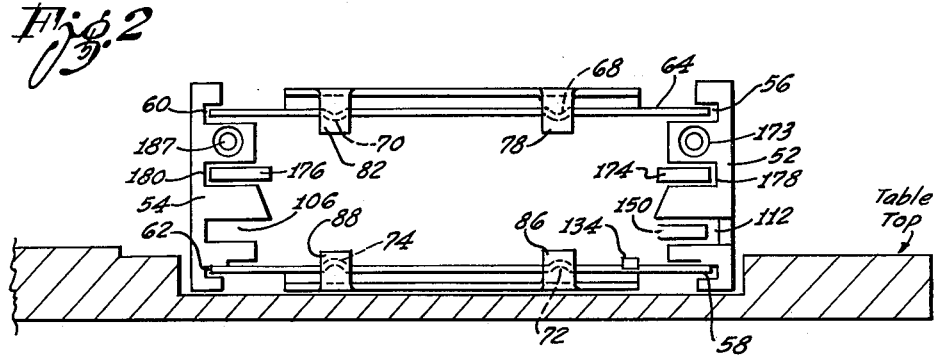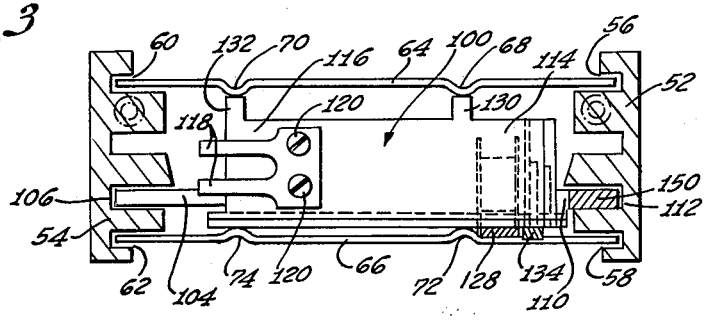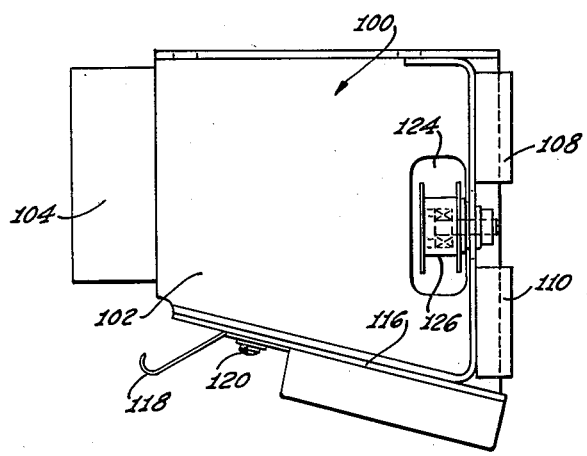

3,005,632
CARD PROCESSING APPARATUS
Allan Orner, Los Angeles, Calif., assignor to The Magnavox Company, Los Angeles, Calif., a corporation of Delaware
Filed July 24, 1959, Ser. No. 829,430
22 Claims. (Cl. 271—61)

The present invention relates to information storage card processing apparatus, and it relates more particularly to a feeding-stacking station for the cards for inclusion in such apparatus.

The invention is primarily concerned with an improved feeding-stacking station which holds the information storage cards in a stacked condition to be controllably fed to a transporting medium, or received from that medium. The feeding-stacking station of the present invention is of the magazine type in which the cards in the station are stacked in a removable magazine. This permits a group of cards to be conveniently inserted in the station for processing, and to be conveniently removed at the termination of such processing.

In one type of data processing system, information is stored in digital form on a plurality of separate cards. The term "cards" is intended to be used in a generic sense in the present specification and claims. This term is intended to refer to any discrete element on which information may be appropriately recorded. Such discrete elements may include, for example, plates or similar articles.

Each of the cards referred to in the preceding paragraphs is provided with a number of positions, each of which (for example) is capable of storing a multi-digit binary number. The information may be stored in the form of separate magnetic areas of a north magnetic polarity or a south magnetic polarity, as is the case with the embodiment of the invention to be described. With such a recording process, a north pole may represent a binary "1," for example; and a south pole may represent, for example, a binary "0."

Alternately, the information may be stored on the cards in the form of hole patterns, in the form of black and white photographic representations, or in any other appropriate form. It will be appreciated that for these various recording forms, it is merely necessary that the card processing apparatus include appropriate transducers for transforming the information on the separate cards into electrical signals, and for transforming electrical signals into the desired recordings on the different cards.

A large number of information storage cards of the type discussed in the preceding paragraph are often required in complex data processing systems. This is because millions of bits of binary data are required to represent the information to be stored in such complex systems. It is most essential, therefore, in these systems to provide some means for storing the cards in a manner in which they may be quickly and conveniently fed to the processing apparatus.

In one type of prior art card processing apparatus, for example, the information storage cards are maintained in a stacked relationship in a feeding-stacking station, and the cards in the feeding-stacking station are controllably fed in succession from the station to an appropriate transport medium. The cards are then carried by the transport medium in the prior art apparatus past a transducer station. One or more appropriate transducers are provided at the transducer station so that the information recorded on the cards may be read as they are transported past the station, and such information may be transformed into electric signals. Conversely, these transducers should be suitable so that new information may be written on the cards from input electric signals, when so desired.

To provide flexibility in the card processing apparatus of the type under discussion, it is preferable that the feeding stations be of the reversible type. That is, each of the stations should be capable of operating in a first mode in which the cards may be controllably fed from the station in sequence to the transport medium, and of operating in a second mode in which the cards may be removed from the transport medium and stacked in the station. Such reversible feeding-stacking stations are described and claimed, for example, in copending application 538,111 (now United States Patent No. 2,842,362) filed October 3, 1955 in the name of Robert M. Hayes, and in copending application 645,639 (now U.S. Patent No. 2,969,979) filed March 12, 1957 in the name of Alfred M. Nelson et al.

A certain problem may sometimes be encountered in the reversible feeding-stacking stations discussed above and in other types of feeding or stacking stations included in the card processing apparatus. This problem relates to the provision of a convenient means for inserting a stack of cards into the feeding-stacking station and for permitting the convenient removal of the stack of cards from the station when the processing has been completed.

The large number of cards involved in the more complex card processing systems referred to above usually requires that the cards not actually being processed be stored in a separate storage area. Then, when any particular group of cards is to be processed, that group is removed from the storage area and inserted in one of the feeding-stacking stations of the card processing apparatus. The cards in that group may then be successively fed into the apparatus for processing. Then, upon the completion of such processing, the group may be returned to the storage area.

Copending application 685,539 (now United States Patent No. 2,901,247) filed September 23, 1957 in the name of Allan Orner discloses and claims an improved card processing apparatus in which the different groups of cards are held in individual magazines, with each magazine holding its group of cards in a stacked condition. The magazines can conveniently be stored in a separate storage area. Then, a desired magazine may be removed from the storage area and placed in a feeding-stacking station of the card processing apparatus whenever a desired card, or cards, in the group in the magazine are to be processed. Then, at the completion of such processing, the magazine may be returned to the storage area. A mechanism for mechanically achieving this selection and return of magazine from a storage area is described and claimed in copending application 808,824 (now U.S. Patent No. 2,968,480) filed April 24, 1959 and assigned to the present assignee.

The improved card processing apparatus of the copending application 685,539 (now United States Patent No. 2,901,247) is constructed so that a selected magazine of cards may be quickly snapped into place in a card holding station in a position to permit the cards immediately to be fed sequentially into the card processing apparatus. The construction of the apparatus of the copending application is such that the magazine can be inserted and withdrawn from the feeding-stacking station without interfering in any manner with the card transfer control components or with any of the other components of the feeding-stacking station.

Copending application 767,132 which was filed October 14, 1958 in the name of Alfred M. Nelson et al., also is directed to card processing apparatus in which removable magazines may be inserted and withdrawn from the feeding-stacking stations. In the magazines used in the apparatus of the application 767,132, each magazine is provided with a closure member at its forward end and with a spring-biased card follower for urging the stack of cards forward in the magazine and towards its mouth.

The magazine of the apparatus described in the copending application 767,132 referred to in the preceding paragraph is supported in its feeding-stacking station in a position spaced from the transport medium. This is so that the card transfer components of the station will not be interfered with by the magazine as they are controlled to set the feeding-stacking station in one operating mode or the other.

An appropriate mechanism is provided for opening the closure member of the magazine of the copending application 767,132 when the magazine is placed in the feeding-stacking station. Then, when the closure member is opened, the spring-loaded card follower forces the cards out of the forward end of the magazine. A guide member is permanently positioned in the feeding-stacking station to guide the stack of cards so pushed by the card follower out of the magazine into a proper position for sequential feeding of the cards to the transport means.

The present invention is also concerned with magazine type of card processing apparatus, such as the apparatus described in the preceding paragraphs. It will be appreciated that certain problems arise in the provision of removable magazines to be used in conjunction with the feeding-stacking stations described above. One of these problems is that of the interference of the movable control components of the station with the magazine when the magazine is in place. For example, most feeding-stacking stations of the type under consideration utilize a movable feed head and a movable stack head. The feed head is moved into position when the station is conditioned for a feeding mode of operation, and it serves to control the feeding of cards from the station to the transport medium. Conversely, the stack head is moved into position when the station is conditioned to a stacking mode, and the stack head controls the deposite of cards from the transport medium into the station.

The magazine described in the copending Orner application 685,539 (now United States Patent No. 2,901,247) is provided with apertured sides adjacent its mouth, so that the feed head and stack head of the station may be unimpeded by the magazine as they are moved between their operative and standby positions. The magazines of the copending Nelson application 767,132, on the other hand, are positioned back from the mouth of the station itself, so that these heads will not be impeded as they are moved from one position to another.

Another problem which is encountered in the magazine type of apparatus under discussion, is that of providing a means for retaining the cards in the magazine when the magazine is removed from the station, and yet of permitting a free flow of cards to and from the magazine when it is in position in the station. The magazine of the copending Orner application 685,539 (now United States Patent No. 2,901,247) is provided with lips which extend over the cards transported by the transport medium. Cards may be fed to and from the magazine of the Orner application by the transport medium which carries the cards over these lips. Then, when the magazine of the Orner application is removed from the station, the lips draw the last card away from the transport medium and serve to retain the cards in the magazine and prevent the cards from falling out through the mouth of the magazine.

The magazine of the copending Nelson application 767,132, on the other hand, uses a door at the mouth of the magazine positively to assure that the cards will not fall out through the mouth of the magazine when it is removed from the feeding-stacking station. Whenever the magazine is placed in the feeding-stacking station, this door is opened to permit the free flow of cards in and out of the magazine.

The present invention provides for an improved and simplified type of apparatus, in which the features of the copending applications described immediately above are realized in a somewhat simpler manner. The magazine of the present invention is provided with lips, similar in some respects to the lips of the magazine in the Orner application 685,539 (now United States Patent No. 2,901,247). In addition, the magazine of the present invention is provided with strip members which are positioned at the sides of the magazine adjacent the mouth. These strip members are spring-biased, and they are disposed in a retracted position in the magazine when the magazine is disposed in the station in the proper position for obtaining a transfer of cards to a transport drum. However, when the magazine is removed from the station, these strip members become displaced outwardly relative to the magazine so that their extremities are positioned adjacent the extremities of the lips. The lips and slide members of the present invention then cooperate with one another to form a simple and positive means for retaining the cards in the magazine when the magazine is removed from the station. By using such simple and positive means, there is no need for a complete front closure member and associated equipment for controlling the opening and closing of that member.

When the magazine of the present invention is removed from the feeding-stacking station, its projecting lips or fingers draw the lead card from the transport means, and the spring-biased strip members move outwardly relative to the magazine to enclose the leading cards and hold them caged within the magazine.

Another feature of the present invention is the provision of permanently mounted dowel pins in the feeding-stacking stations. These pins are precisely located, and they engage corresponding bushings in the leading edge of the magazine as the magazine is inserted into place. These pins, and the cooperating bushings, serve to precisely locate the magazines within the station. This is essential for the rapid and smooth feed of the cards from the magazine to the transport medium, and vice versa.

Another feature of the invention is the provision of a guiding surface on at least one of the spring-loaded strip members referred to above. This guiding surface becomes operative when the magazine is moved into place in the station and when the particular slide member is moved back away from its extended caging position to a retracted position. At such a time, the guiding surface on the strip member becomes operative to cam the cards into proper position for facilitating a sequential transfer of the cards to the transport medium.

Other features and advantages of the present invention will become apparent upon a consideration of the following description, when taken in conjunction with the accompanying drawings, in which:

FIGURE 1 is a top plan view of a simplified form of card processing apparatus which is constructed to incorporate the present invention, the illustrated apparatus including a pair of feeding-stacking stations constructed in accordance with the invention and disposed adjacent a transport medium which, in the illustrated embodiment, is a vacuum pressure rotatable drum;

FIGURE 2 is a front elevational view, substantially on the line 2—2 of FIGURE 1, to show the details of a removable magazine which is positioned in one of the feeding-stacking stations, and this view also illustrating the slide members which are positioned in the magazine for card retaining purposes, as will be described;

FIGURE 3 is a sectional view, substantially on the line 3—3 of FIGURE 1, this sectional view also showing details of the magazine, a card follower being illustrated in the latter view and which is positioned in the magazine for biasing a stack of information cards normally held in the magazine towards its mouth and against the transport drum;

FIGURE 4 is a top view of the card follower and illustrates the different components which make up the follower, this latter view also showing a guide member which engages a slot in one of the walls of the magazine to permit the card follower to move back and forth in the magazine and a locking bar which is controlled in a manner to be described to lock the card follower in the magazine when the magazine is removed from the station;

FIGURE 5 is a fragmentary top plan view, partly in section, and on an enlarged scale with respect to FIGURE 1, the sectional portion of the view of FIGURE 5 illustrating the manner in which a pair of actuators cooperate with one another and with the locking bar in the magazine to cause the locking bar to be moved to a disengaged position when the magazine is moved into place in the station;

FIGURE 6 is a side view on an enlarged scale with respect to the views of FIGURES 2 and 3 and showing the inner side of one of the walls of the magazine, this latter view also showing a locking bar and showing one of the slide members in its protruding position, and further showing biasing springs which are disposed in channels formed on that side;

FIGURE 7 is a side elevational view on an enlarged scale with respect to the views of FIGURES 2 and 3 of the inner surface of the outer wall of the magazine, this latter view showing another of the slide members positioned in a channel on that surface and a resilient spring which is positioned in the channel to bias that slide member to its illustrated extended position; and FIGURE 8 is a perspective view of the magazine of FIGURE 1, illustrating that magazine positioned in its corresponding feeding-stacking station but with certain stop members removed to reveal the slide members in their extended positions, and showing the various other components of the magazine and their engagement with corresponding components of the station.

The data processing apparatus and system of FIGURE 1 is shown as including a transport means, such as a vacuum transport drum 10. This drum is constructed, for example, in the manner described and claimed in co-pending application 600,975 (now United States Patent No. 2,883,189) which was filed July 30, 1956 in the name of Loren R. Wilson. The drum is rotatably mounted on a table top 12 for rotation in a clockwise direction. The drum is capable of exerting a vacuum pressure at its peripheral surface, and by means of this vacuum pressure the information storage cards are held at spaced angular positions on the peripheral surface of the drum for transportation from one station to another. Full details of a rotatable vacuum pressure transport drum, such as the drum 10, may be found in the Wilson application.

Although drums, such as the drum 10, are shown for transporting the cards; any other suitable transport means may be used, and such transport means do not necessarily have to be movable. For example, stationary transport means such as disclosed in copending application Serial No. 730,102, filed April 22, 1958 in the name of Eric Azari et al.; and in copending application Serial No. 731,413 filed April 28, 1958 in the name of Eric Azari may be used.

A first transducing means 14 is mounted on the table top 12, and that transducing means is positioned to be contiguous to the periphery of the vacuum pressure transport drum 10. A second transducing means 16 may also be mounted on the table top 12. This second transducing means is positioned on the opposite side of the drum 10 from the transducing means 14, and the transducing means 16 is also positioned to be contiguous to the periphery of the drum. Each of the transducing means 14 and 16 may, for example, comprise a plurality of electromagnetic write or read transducer heads. Each of these heads is positioned to sense and process a different row of data on each of the cards transported on the periphery of the drum 10 past its corresponding transducer means.

The transducing means 14 and 16 are positioned to permit the cards to be carried past their activated faces by the transport drum 10. Each of these transducing means functions to read data on the transported cards, or to write new data on the cards, as mentioned above. Also, and as also mentioned above, the type of transducing means corresponds to the particular type of recording by which the information is stored on the different cards.

A first reversible feeding-stacking station is indicated generally as 18, and this station is positioned on the table top 12 at one side of the drum between the transducing means 14 and 16. A second reversible feeding-stacking station 20 is also positioned on the table top 12, the station being positioned on the opposite side of the drum 10 from the station 18. Both the stations 18 and 20 are shown in fragmentary form to conserve space. The forward end only of each of these stations is shown, as a showing of that end is believed to be sufficient for purposes of explaining the operation of the present invention.

The feeding-stacking station 18 includes a stack head 22 and it includes a feed head 24. These heads may be constructed and controlled in a manner fully described in the copending application 645,639 referred to above. Briefly, the stack head 22 is movable from a stand-by position to the right in FIGURE 1, as illustrated, to an operative position in which its end is contiguous to the periphery of the drum 10. In its operative position, the stack head engages cards transported on the peripheral surface of the drum and causes such cards to be moved from the peripheral surface of the drum and to be deposited in the station 18.

The feed head 24 is movable from a stand-by position to the left in FIGURE 1 to its illustrated operative position. When the feed head is in its operative position it controls the feed of cards to the peripheral surface of the drum 10. This control is made through a vacuum pressure which the feed head exerts on the cards in the station, and which may be controllably interrupted. Such a feed head and its vacuum pressure control on the cards is described in detail in the copending application 645,639 referred to above.

The copending application 645,639 also fully describes the manner in which the feed head 24 and the stack head 22 may be moved between their stand-by and operative positions. Because the actual control and operation of the feed head and of the stack head form no part of the present invention, it is believed unnecessary to describe in detail the manner in which these heads are controlled. It is believed sufficient to state that the heads may be conveniently controlled by mounting them on appropriate levers and by providing a cam control for the levers. Such a control is described, for example, in the copending application 645,639, and it provides for one of the heads to be moved to its operative position as the other is moved to a stand-by position, and vice versa.

The feeding-stacking station 20 may also include a feed head 36 which is movable between an operative and a stand-by position, and it may include a stack head 40 which likewise is movable between a stand-by and an operative position. The stack head 40 and the feed head 38 may be similar to the corresponding heads 22 and 24 described above in conjunction with the feeding-stacking station 18. The heads 36 and 40 may be controlled to be moved between their individual operative and stand-by positions in the same manner as described in copending application 645,639.

As best shown in FIGURE 8, the table top 12 is provided with a groove at the station 18 for receiving a magazine 50. The magazine 50 may have a rectangular configuration, and it is provided with a pair of side walls 52 and 54. As best shown in FIGURES 2, 3 and 8, the side wall 52 is provided with an upper slot 56 and a lower slot 58. These slots extend lengthwise along the entire inner surface of the sidewall. In like manner, the side wall 54 is provided with a slot 60 which is aligned with the slot 56, and the slot 60 extends along the entire inner surface of the side wall 54.

A lower slot 62 is also formed in the side wall 54, and the latter slot is aligned with the slot 58 and extends along the entire inner surface of the wall 54. A top panel 64 is inserted in the slots 56 and 60, and this panel is attached to the side walls by epoxy bonding, for example, or by any other appropriate means. Likewise, a lower panel 66 extends into the slots 58 and 62, and the lower panel is attached to the side walls also by epoxy bonding, for example, or by any other appropriate means. The panels 64 and 66 form the top and bottom of the magazine respectively. These panels, together with the side walls 52 and 54 cooperate to form an open mouth at the forward end of the magazine.

A pair of downwardly extending ribs 68 and 70 are formed in the upper panel 64, and these ribs extend lengthwise along the panel. A similar pair of upwardly extending ribs 72 and 74 are formed in the lower panel 66, and these latter ribs extend the entire length of the lower panel. The ribs 68 and 70 are spaced and parallel to one another in the plane of the upper panel 64, and the ribs 72 and 74 are spaced and parallel to one another in the plane of the lower panel 66. The ribs 68 and 72 are axially aligned with one another, as are the ribs 70 and 74. These ribs engage the edges of the cards which are held in the magazine and they form guides for the cards as the cards are moved back and forth in and out of the magazine.

An upper bracket 76, as shown in FIGURES 1 and 8, is bonded, or otherwise attached, to the top panel 64 of the magazine. The bracket 76 has a pair of finger-like elements 78 and 82 which extend out from the mouth of the magazine and over the upper peripheral surface of the drum 10. These finger-like elements have downwardly extending bent-over end portions which extend over the upper edge of each card transported by the drum to the mouth of the station.

A similar bracket 84 is mounted on the underside of the lower panel 66, and the latter bracket has a pair of finger-like members 86 and 88. These finger-like members 86 and 88 extend outwardly from the mouth of the magazine and under the rim of transport drum 10. The finger-like members 86 and 88 each have a bent-over upstanding extremity which extends around the lower edge of each card transported by the drum to the mouth of the magazine.

The finger-like elements 78, 82, 86 and 88 permit the magazine to be positioned with its mouth displaced back from the periphery of the drum 10. This enables the feed head 24 and the stack head 22 to be moved between their operative and stand-by positions without interference by the walls of the magazine. The finger-like elements extend out over the cards which are disposed between the space between the mouth of the magazine and the periphery of the drum 10, as such cards are fed from the magazine to the periphery of the drum during the feeding mode of operation, or when such cards are fed from the periphery of the drum into the station during a stacking mode of operation.

Then, when it is desired to withdraw the magazines from the station, the bent-over portions of the finger-like elements engage the card on the periphery of the drum 10, and the finger-like elements draw that card and the cards in the space between the mouth and the periphery away from the drum. The bent-over finger-like elements, and other sliding elements to be described, form a cage for the cards at the forward end of the magazine and firmly retain the cards in the magazine and present them from falling out of the mouth of the magazine.

A card follower 100, as best shown in FIGURES 3 and 4, is positioned in the magazine for longitudinal movement along the ribs 72 and 74 towards the mouth of the magazine and back away from the mouth. The illustrated construction of the card follower 100 is merely by way of example, other types may be used. The card follower 100 may be constructed in the manner described in copending application Serial No. 717,270, filed February 24, 1958 in the name of Eric Azari et al.

The card follower is spring-biased toward the mouth of the magazine, and its function is to maintain the cards in a stacked condition in the magazine and to bias the cards against the peripheral surface of the drum 10. Then, as the cards are sequentially fed to the periphery of the drum, the card follower 100 moves forward in the magazine. Conversely, when the cards are stacked from the drums in the magazine during the stacking mode of operation, the card follower 100 moves back against its spring-biasing pressure. During both modes of operation, however, the card follower moves against the stack of cards in the magazine with a positive pressure so as to hold the cards in a stacked condition.

The card follower 100 includes a flat bottom panel 102 which may have a lubricating substance, such as "Teflon," mounted on its lower surface and which engages the ribs 72 and 74. A first guide strip 104 is secured to one side of the bottom panel 102, and this guide strip extends into a slot 106 which is formed on the inner surface of the side wall 54. The slot 106 extends along the length of the side wall, and it serves as a guide for the card follower 100.

The bottom panel 102 of the card follower also has a pair of hard rubber, or neoprene, guide strips 108 and 110 secured to its other edge. These latter guide strips are positioned adjacent a slot 112 in the inner surface of the side wall 52 when the follower is in place in the magazine. The slot 112 extends lengthwise along the length of the inner surface of the side wall 52.

A resilient pad 114 formed, for example, of sponge rubber or similar substance, is secured to an upstanding bracket 116 at the front of the card follower 100. As illustrated in FIGURE 4, the bracket 116 and the member 114 are inclined when viewed in plan so that the cards may be brought into the proper position for feeding them to the periphery of the drum 10, when the station is conditioned to the feeding mode.

A pair of contacts 118 are fastened to the bracket 116 by means, for example, of a pair of screws 120. These contacts are connected to one another, and they serve to engage a pair of further cards on the face of the feed head 24 when the last card is fed out of the station 18. This engagement completes an appropriate electric circuit, and under the control of suitable logic circuitry, certain desired controls may be initiated when the last card leaves the station. For example, when that occurs, it is often desirable to change the mode of operation of the station from the feeding to the stacking mode. This enables cards in the feeding-stacking station 20, for example, to be fed from that station and returned to the station 18.

The bottom panel 102 of the card follower 100 has a slot 124 formed in it adjacent the guide strips 108 and 110. A bearing 126 is rotatably mounted on an appropriate bracket to be positioned over the slot 124. A resilient spring strip 128 is secured to the panel 66 at its forward end, and this spring strip has a tendency to curl up on itself around the rotatable bearing 126. This action of the spring strip 128, and of the bearing 126, causes the card follower to be biased forwardly with a positive force towards the mouth of the magazine. This enables the card follower to perform its desired function which, as described, is to urge the stack of cards towards the mouth of the station and thereby maintain the cards in a stacked condition.

The upstanding bracket 116 is equipped with a pair of upwardly extending portions 130 and 132, as best shown in FIGURE 3. These portions 130 and 132 engage the underside of the ribs 68 and 70 respectively. A guide rail 134 is inserted in the lower panel 66, and this guide rail extends into a slot formed in the bottom of the panel 102.

Therefore, the card follower 100 is supported between the ribs 68, 72 and 70, 74 and by the guide bracket 102 and its guide slot 106, and by the guide rail 134 and its corresponding slot in the bottom panel 102. The card follower 100 is so supported for longitudinal movement in the magazine towards and from the mouth of the magazine. As mentioned above, the spring strip 128 serves to bias the card follower towards the mouth of the magazine.

An elongated strip 150 is mounted in the channel 112 of the side rail 52 to lie adjacent the edges of the strips 108 and 110. The outer edges of the rubber guide strips 108 and 110 may be serrated, as may the facing edge of the strip 150.

As described in detail in the copending application Serial No. 823,690 the strip 150 forms a slidable locking bar, and it is slidably mounted in the slot 112 for limited longitudinal movement relative to the side wall 52. The arrangement is such that when the locking bar 150 is moved forwardly in the slot 112 it moves away from the strips 108 and 110 to a disengaged position. However, when the locking bar 150 is moved back along the slot 112 towards the rear of the magazine, it is moved laterally inwardly so that its inner edge engages the facing edges of the strips 108 and 110. This latter movement of the locking bar 150 is into an engaged position with respect to the card follower 100. When the locking bar is in such an engaged position, it firmly retains the card follower 100 in whatever position the card follower is established by the cards in the magazine when the locking bar 150 moves to its engaged position.

As more clearly shown in FIGURE 5, the locking bar 150 is mounted in the channel 112 by means of a plurality of upstanding studs, such as the stud 154. These studs extend through inclined slots, such as the slot 156 which are formed in the locking bar. A suitable resilient spring, which will be described in conjunction with FIGURE 6, serves to normally bias the locking bar 150 towards the rear of the magazine. Such a biasing action causes relative movement between the studs 154 and the slots 156, so that the locking bar 150 is moved against the edges of the strips 108 and 110 of FIGURE 4. This causes the locking bar to lock with the strips 108 and 110 and thereby to retain the follower 100 in a locked position.

A stud 160 is formed on the side wall 52 of the magazine, and a pawl 162 is mounted in the station 18. The pawl has a portion extending through a slot in the magazine to be engaged by the stud 160 (see particularly FIGURE 5) as the magazine is moved into place in the station 18. The pawl 162 is mounted for limited reciprocal motion in the station 18, and it is spring-biased by any appropriate biasing means (not shown) in a direction towards the rear of the station.

A further actuating pawl 164 is rotatably mounted in the station 18, and this latter pawl is spring-biased by any appropriate biasing means (not shown) in a clockwise direction. The pawl 162 engages the further pawl 164, so that when the pawl 162 is actuated by the stud 160 it moves against the further pawl 164. This causes the further pawl to be pivoted in a counter-clockwise direction against its spring-biasing means.

The further pawl 164 has an actuating arm 166 which extends through a slot in the magazine and into a slot 168 formed in the side of the locking bar 150. The result is that when the magazine is moved into place in the station 18, the stud 160 causes the pawl 162 to move against the pawl 164. The actuating arm 166 of the pawl 164 then causes the locking bar 150 to be moved forward towards the mouth of the magazine thereby disengaging the locking bar from the card follower 100. Conversely, when the magazine is moved back out of the station 18, the locking bar 150 becomes disengaged from the finger 166 of the pawl 164 and it is spring-biased back into locked engagement with the card follower 100.

The operation described above provides that whenever the magazine is placed in the station 18, its card follower 100 is disengaged from the locking bar, and this enables the card follower to be spring-biased toward the mouth of the magazine. The card follower then is able to perform its intended function of maintaining the cards in a stacked condition in the magazine. However, whenever the magazine is removed from the station, and regardless of the length of the stack of cards in the magazine, the card follower immediately becomes locked by the locking bar into a position in which it is held firmly against the back of the stack of cards in the magazine. This enables the card follower to firmly retain the cards in the magazine, so as to prevent the cards from falling out of the magazine as it is moved to or from the storage area.

In FIGURE 1, for example, a locating member 170 is positioned in the station 18 adjacent the leading edge of the side wall 52 of the magazine when the magazine is moved into position in the station 18. The locating member 170 is positioned adjacent a feed throat member 172, but these members are spaced from one another. The feed throat member 172 has an extremity 172a which is precisely positioned adjacent the periphery of the vacuum transport drum 10. The extremity 172a defines a feed throat with the drum 10, and this permits one card at a time only to pass from the station onto the periphery of the drum.

The station 18 is illustrated in FIGURE 1 as being in its feeding mode of operation. For that mode of operation the stack head 22 is withdrawn to a stand-by position, and the feed head 24 is moved to an operative position. A vacuum pressure is established at the face of the feed head 24, and that face engages the rear portion of the front face of the leading card in the station 18. The vacuum pressure exerted at the periphery of the drum 10 acts on the forward portion of the front face of the leading card. However, the vacuum pressure from the feed head is greater, so that the feed head is able to hold the leading card in the station 18, and the leading card in turn holds the remaining cards in the station. However, whenever the vacuum pressure at the face of the feed head 24 is interrupted, the cards are able to pass in a one-by-one sequence through the feed throat formed by the portion 172a of the member 172.

As best shown in FIGURE 2, a further pair of slide members 174 and 176 are positioned in slots 178 and 180 formed in the inner surfaces of the side walls 52 and 54 respectively. These latter slide members are spring-biased in a manner to be described so that they normally protrude outwardly from the ends of the side walls 52 and 54 adjacent the mouth of the magazine and to the position illustrated in FIGURES 6, 7 and 8. When the slide members 174 and 176 are in their extended positions, their extremities extend into the plane of the ends of the finger-like members 78, 82 and 76, 88.

The slide members 174 and 176 serve to retain the leading cards in the magazine when the magazine is withdrawn from the station 18. As the magazine is so withdrawn, the bent-over end portions of the finger-like elements 78, 82 and 86, 88 draw the last card off the periphery of the drum 10, and the card follower becomes locked in the manner described above, so that the cards in the magazine are held in a stacked condition and between the card follower and the bent-over end portions of the finger-like elements. At the same time, as the magazine is removed, the slide members 174 and 176 move forwardly with respect to the side walls of the magazine and into the plane of the end portions of the finger-like elements 78, 82, 86 and 88 to form a cage and prevent the cards in the station from sliding out of the magazine.

The slide members 174 and 176, therefore, serve to cage the leading cards in the magazine against lateral movement when the magazine is withdrawn from the station 18. By "lateral" movement is meant a movement toward the right or left in FIGURE 1. Furthermore, the cards are retained in the magazine against longitudinal movement, this retention occurring through the action of the bent-over extremities of the finger-like elements and the locked card follower 100. By "longitudinal" movement is meant a movement toward or away from the transport drum 10.

The constructional details of the slide members 174 and 176, and the manner in which they are slidably mounted in the side walls of the magazine, will be described in detail in conjunction with FIGURES 6 and 7. It should be pointed out at this time, however, that when the magazine is moved into position in the station 18, a stop and locating member 184, which is mounted in the station adjacent the feed head 24, engages a shoulder on the slide member 176 so that the slide member 176 remains stationary while the magazine is moved forwardly toward the transport means. This causes the slide member 176 to become in effect retracted into the slot 180 in the magazine.

A portion 176a of the slide member 176 extends outwardly from the magazine whether the slide member is in its retracted position or in its forward position relative to the magazine. This is illustrated in FIGURE 1 for the retracted position of the slide member 176. The protruding portion 176a extends into a position closely adjacent the feed head 24, and it has a cammed inner surface which is inclined slightly toward the right in FIGURE 1 with progressive positions toward the transport drum 10. By providing the cammed inner surface on the portion 176a of the slide member 176, the portion 176a serves to shift or cam the cards in the station laterally to the right into the appropriate feeding position with respect to the feed head after the magazine has been moved into place.

The slide member 174 engages the locating member 170 and is held stationary when the magazine 50 is moved into the proper position for obtaining a transfer of cards to the transport drum 10. Since the slide member 174 is held stationary while the magazine 50 is being moved forwardly toward the transport drum 10, the slide member 174 becomes retracted relative to the magazine.

As best shown in FIGURE 1, a locating pin 171 is mounted in the locating member 170, and this pin extends into a bushing 173 (see FIGURE 2) which is mounted in the side wall 52 and which extends inwardly from the front edge of the side wall. Likewise, a locating pin 185 (FIGURE 1) is mounted on the locating and stop member 184, and this latter locating pin engages a bushing 187 (see also FIGURE 2) which is mounted in the side wall 54 of the magazine. The bushing 187 extends inwardly from the leading edge of the side wall 54.

The bushings 173 and 187 are precisely positioned in the magazine, and the pins 171 and 185 are precisely positioned in the station. The pins in their engagement with the bushings serve to bring the magazine into a precise alignment with the various transfer components of the station 18. These transfer components, for example, include the stack head 22, the feed head 24 and the stop member 170.

As best shown in FIGURE 6, the locking bar 150 is positioned in the slot 112 in the side wall 52 of the magazine by a plurality of studs 154. These studs, as explained in conjunction with FIGURE 5, extend through inclined slots in the locking bar, so that the locking bar moves laterally in and out of an engaged position with respect to the strips 108 and 110 of the card follower 100, as the locking bar is moved longitudinally in the slot 112.

A bias spring 200 is mounted on the rear end of the locking bar 150. One end of this spring abuts against a washer 202 which, in turn, engages a shoulder at the rear end of the slot 112. The washer 202 is constructed to provide for a movement of the locking bar relative to it.

The other end of the spring 200 engages a washer 204 which may be welded, or otherwise mounted, on the end of the locking bar 150. The spring 200, therefore, serves normally to bias the locking bar towards the rear of the magazine and into its engaged position.

As also shown in FIGURE 6, the slide member 174 is positioned in its slot 178 in the side wall 52 of the magazine by means, for example, of one of the studs 154 and by a stud 208. These studs extend through appropriate slots which extend longitudinally in the bar 174. A spring 210 is positioned on the bar 174, and one end of the spring bears against a washer 212. The washer 212, in turn, abuts against a shoulder formed in the side wall 52. The forward end of the spring 210 abuts against a washer 214 which may be welded, or otherwise mounted, on the bar 174. Therefore, the slide bar 174 is normally biased out to its protruding position shown in FIGURE 8. However, when the magazine is inserted into place in the station, as shown in FIGURE 1, the slide bar 174 becomes effectively retracted by the locating member 170 into its slot in the magazine 50 by holding the slide bar stationary as the magazine is moved forwardly toward the transport drum 10.

As shown in FIGURE 7, the slide bar 176 is mounted in its slot 180 in the side wall 54 of the magazine by means of a pair of studs 220. These studs extend through appropriate longitudinal slots in the slide bar 176 to permit limited movement of the slide bar with respect to the side wall 54. A spring 222 is mounted on the slide bar 176, and the rear end of that spring abuts against a washer 224 which, in turn, abuts against a shoulder formed in a side wall 54. The forward end of the spring 222 abuts against a washer 226 which is mounted on and shouldered against the slide bar 176. The spring 222, therefore, serves to bias the slide bar 176 to its protruding position, as shown in FIGURE 8. However, when the magazine is moved into place in the station 18, the stop member 184 causes the slide bar 176 to become effectively retracted relative to the magazine to the position illustrated in FIGURE 1 by holding the slide bar stationary as the magazine is moved forwardly toward the transport drum 10.

The invention provides, therefore, a new and improved feeding-stacking station for use in card processing apparatus. The new and improved feeding-stacking station of the invention is of the removable magazine type. The removable magazine portion of the station is constructed in the described manner so that it can be positioned with its mouth spaced back from the transport means. This permits the various transfer components of the magazine to operate without interference from the side walls or other components of the magazine itself. In accordance with a feature of the invention, spring-biased slide members are provided in the side walls of the magazine, and these slide members move outwardly from the mouth of the magazine as the magazine is removed from the station. The action of these slide members, together with the fingerlike elements, causes the cards to be firmly retained in the magazine when it is removed from the station.

Also, in accordance with the present invention, suitable dowel pins are provided in precisely located positions in the station itself. These dowel pins engage bushings which are positioned respectively in the side walls of the magazine and which extend inwardly from the respective leading edges of these side walls. The engagement of the dowel pins with the bushings causes the magazine to be precisely located in the station when it is moved into position in the station.

I claim:

1. In apparatus for processing data on a plurality of information storage cards, the combination of: transport means for the cards, a removable magazine having a pair of side walls and a mouth and constructed to hold the information storage cards in a stacked relationship, supporting means operatively coupled to the magazine for holding the magazine in a particular position thereon with the mouth of the magazine facing the transport means so that cards may be fed through the mouth of the magazine between the magazine and the transport means, a pair of card retaining slide members slidably mounted in respective ones of the side walls of the magazine to be individually movable between a first position in which the retaining slide members protrude outwardly from the mouth of the magazine and a retracted position, means coupled to the card retaining slide members for biasing the same to their first positions, and stop means positioned on the supporting means for engaging the card-retaining slide members to hold said retaining slide members stationary when the magazine is moved to its particular position on said supporting means so as to force the retaining slide members to their retracted positions with respect to the magazine when the magazine is in said particular position.

2. In apparatus for processing data on a plurality of information storage cards, the combination of: transport means for the cards, a removable magazine having a pair of side walls and a mouth and constructed to hold the information storage cards in a stacked relationship, supporting means operatively coupled to the magazine for holding the magazine at a particular position thereon with the mouth of the magazine facing the transport means so that cards may be fed through the mouth of the magazine between the magazine and the transport means, a pair of elongated card retaining slide members slidably mounted in respective ones of the side walls of the magazine to be individually movable between a first position in which the retaining slide members protrude outwardly from the mouth of the magazine and a retracted position, a first resilient spring member mounted on one of the side walls of the magazine in engagement with one of the card retaining members for normally biasing the same to its first position, a second resilient spring member mounted on the other of the side walls in engagement with the other of the card retaining members for normally biasing the same to its first position, and a first stop member and a second stop member mounted on the supporting means for respectively engaging the card retaining slide members to hold said card retaining slide members stationary when the magazine is moved to its particular position on said supporting means so as to force the retaining slide members to their retracted positions with respect to the magazine when the magazine is at said particular position.

3. In apparatus for processing data on a plurality of information storage cards, the combination of: transport means for the cards, a removable magazine having a pair of side walls and a mouth and constructed to hold the information storage cards in a stacked relationship, supporting means operatively coupled to the magazine for holding the magazine at a particular position thereon with the mouth of the magazine facing and spaced from the transport means so that cards may be fed through the mouth of the magazine between the magazine and the transport means, a plurality of finger-like members mounted on the magazine and extending outwardly from the mouth thereof toward the transport means, each of the finger-like members having a bent-over end portion for extension over the edges of the cards carried by the transport means to the mouth of the magazine, a pair of card retaining slide members slidably mounted in respective ones of the side walls of the magazine to be individually movable between a retracted position and an extended position in which the retaining members protrude outwardly from the mouth of the magazine into the plane of the bent-over end portions of the finger-like members, means coupled to the card-retaining slide members for normally biasing the same to their extended positions, and a first stop member and a second stop member mounted on the supporting means for respectively engaging the card retaining members to hold said retaining slide members stationary when the magazine is moved to its particular position on said supporting means so as to force the retaining slide members to their retracted positions with respect to the magazine when the magazine is at said particular position.

4. In apparatus for processing data on a plurality of information storage cards, the combination of: transport means for the cards, a removable magazine having a mouth and constructed to hold the information storage cards in a stacked relationship, supporting means operatively coupled to the magazine for holding the magazine at a particular position thereon with the mouth of the magazine facing the transport means so that cards may be fed through the mouth of the magazine between the magazine and the transport means, at least one card-retaining slide member mounted in the magazine adjacent the mouth thereof to be movable between a first position in which the retaining member protrudes outwardly from the magazine and a retracted position, means coupled to the card retaining slide member for biasing the same to its first position, first locating means positioned on the magazine, and stop means positioned on the supporting means for engaging the card-retaining slide member to hold said card retaining slide member stationary when the magazine is moved to its particular position on said supporting means so as to force the retaining slide member to its retracted position with respect to the magazine when the magazine is in said particular position, the stop means being constructed to engage the first locating means upon the movement of the magazine toward the particular position on the supporting means to position the magazine at said particular position.

5. The combination defined in claim 4 in which one of said locating means includes a dowel pin and the other of said locating means includes a bushing for receiving the pin.

6. In apparatus for processing data on a plurality of information storage cards, the combination of: transport means for the cards, a removable magazine having a pair of side walls and a mouth and constructed to hold the information storage cards in a stacked relationship, supporting means operatively coupled to the magazine for holding the magazine at a particular position thereon with the mouth of the magazine facing the transport means to obtain a transfer of the cards in the plurality through the mouth of the magazine and between the magazine and the transport means, a pair of card-retaining slide members slidably mounted in respective ones of the side walls of the magazine to be individually movable between a first position in which the retaining members protrude outwardly from the mouth of the magazine and a retracted position, means coupled to the card-retaining slide members for biasing the members to their first positions, a first pair of locating members positioned on said side walls at the mouth of said magazine and facing the transport means, and stop means positioned on said supporting means for engaging the card retaining slide members to hold said card-retaining slide members stationary when the magazine is moved to its particular position on said supporting means so as to force the slide members to their retracted positions with respect to the magazine when the magazine is moved to said particular position, the stop means being constructed to engage respective ones of said first pair of locating members upon the movement of the magazine toward the particular position on the supporting means to position the magazine at said particular position.

7. The combination defined in claim 6 and in which said locating members of said first pair are in the form of respective bushings, and the locating members of the second pair are in the form of respective dowel pins respectively positioned to extend into respective ones of the bushings as the magazine is moved into said particular position on said supporting means.

8. In combination for use in apparatus for processing data on a plurality of information storage cards: a magazine having a pair of side walls and a mouth and constructed to hold the information storage cards in a stacked relationship, a pair of elongated card-retaining members slidably mounted in respective ones of the side walls of the magazine to be individually movable relative to the magazine between a first position in which the retaining members protrude outwardly from the mouth of the magazine and a retracted position, a first resilient spring member mounted on one of the side walls of the magazine in engagement with one of the card-retaining members for biasing the same to its first position, and a second resilient spring member mounted on the other of the side walls of the magazine in engagement with the other of the card retaining members for biasing the same to its first position.

9. In combination for use in apparatus for processing data on a plurality of information storage cards: a magazine having a pair of side walls and a mouth and constructed to hold the information storage cards in a stacked relationship, a plurality of finger-like members mounted on the magazine and extending outwardly from the mouth thereof, each of the finger-like members having a bent-over end portion, a pair of card-retaining members slidably mounted relative to the magazine in respective ones of the side walls of the magazine to be individually movable between a retracted position and a second position in which the retaining members protrude outwardly from the mouth of the magazine and into the plane of the bent-over end portions of the finger-like members, and means coupled to the card-retaining members for biasing the same to their second positions.

10. The combination set forth in claim 9 in which means are operatively coupled to the card-retaining members for obtaining a disposition of the members in their retracted position relative to the magazine to facilitate a transfer of the cards through the mouth of the magazine.

11. In apparatus for processing data on a plurality of information storage elements, the combination of: transport means for the information storage elements, magazine means constructed to hold the information storage elements and to obtain a transfer of elements between the transport means and the magazine means upon a particular disposition of the magazine means relative to the transport means, supporting means operatively coupled to the magazine means for holding the magazine means in the particular position relative to the transport means to obtain a sequential transfer of the storage elements between the magazine means and the transport means, retractable means disposed within the magazine and biased to a particular position within the magazine and operatively coupled to the elements in the magazine for retaining the storage elements within the magazine in the particular position of the retractable means, the retractable means being retractable relative to the magazine means from the particular position and being disposed relative to the elements in the magazine in the retracted position to obtain a transfer of elements between the magazine means and the transport means, and means operatively coupled to the retractable means to obtain a disposition of the retractable means to the retracted position with respect to the magazine upon a movement of the magazine on the supporting means to the particular position relative to the transport means.

12. In apparatus for processing data on a plurality of information storage elements, the combination of: transport means for the information storage elements, magazine means constructed to hold the information storage elements in a stacked relationship and having a mouth through which the information storage elements may be sequentially transferred, supporting means operatively coupled to the magazine means for holding the magazine means in a particular position relative to the transport means to obtain a sequential transfer of the storage elements between the transport means and the magazine means through the mouth of the magazine means, at least one retractable slide member operatively coupled to the elements in the magazine means in a particular position of the slide member relative to the magazine means for inhibiting the transfer of the storage elements between the magazine means and the transport means in the particular position of the retractable slide member, the slide member being disposed relative to the magazine means for sliding movement and being biased to the particular position and being retractable from the particular position relative to the magazine means to a position relative to the magazine means for providing for a transfer of elements in the plurality between the magazine means and the transport means, and means operatively coupled to the retractable slide member to obtain a movement of the member to the retracted position with respect to the magazine upon the particular disposition of the magazine means on the supporting means.

13. In apparatus for processing data on a plurality of information storage cards, the combination of: transport means for the cards, a removable magazine having a mouth and constructed to hold the information storage cards in a stacked relationship and to obtain a transfer of cards in the plurality between the magazine and the transport means through the mouth of the magazine, supporting means operatively coupled to the magazine for holding the magazine at a particular position on the supporting means with the mouth of the magazine facing the transport means to obtain a transfer of cards in the plurality through the mouth of the magazine between the magazine and the transport means, at least one card-retaining slide member mounted in the magazine adjacent the mouth of the magazine for sliding movement between a position protruding outwardly from the magazine and a retracted position, the slide member being disposed relative to the cards in the plurality in its protruding position to cage the cards in the magazine against movement and being disposed relative to the cards in the plurality in its retracted position to provide for a transfer of the cards between the magazine and the transport means, means coupled to the card retaining slide member for biasing the slide member to the protruding position, and means positioned on the supporting means for engaging the card-retaining slide member during the movement of the magazine on the slide member to the particular position to obtain a movement of the slide member to the retracted position.

14. In apparatus for processing data on a plurality of information storage cards, the combination of: transport means for the cards, a removable magazine having a mouth and constructed to hold the information storage cards in a stacked relationship and to provide a transfer of cards between the transport means and the magazine through the mouth of the magazine, supporting means operatively coupled to the magazine for holding the magazine at a particular position on the supporting means with the mouth of the magazine disposed relative to the transport means to obtain a transfer of the cards in the plurality through the mouth of the magazine and between the magazine and the transport means, first locating means positioned on the magazine, means disposed relative to the cards in the magazine for holding the cards in the magazine to prevent any transfer of cards between the magazine and the transport means, and second locating means positioned on the supporting means for engaging the first locating means upon the movement of the magazine toward the particular position on the supporting means to position the magazine at said particular position and for engaging the holding means upon the movement of the magazine to the particular position on the supporting means to release the cards in the magazine for a transfer of cards in the plurality between the magazine and the transport means.

15. In combination for use in apparatus for processing data on a plurality of information storage elements, magazine means constructed to hold the information storage elements in a stacked relationship and having a mouth through which the storage elements may be transferred into and out of the magazine, and means including retractable means extending through the magazine to a position protruding from the mouth of the magazine and biased for operative coupling to the elements in the magazine to retain the storage elements in the magazine, and means operatively coupled to the retractable means for obtaining a retraction of the retractable means into the magazine to free the mouth of the magazine for the transfer of cards through the mouth of the magazine.

16. In combination for use in apparatus for processing data on a plurality of information storage elements, magazine means constructed to hold the information storage elements in a stacked relationship and having a mouth through which the information storage elements may be sequentially transferred, at least a first member extending through the magazine at a lateral extremity of the magazine and movable to a first position for engaging the sides of the elements in the magazine to inhibit the transfer of the storage elements through the mouth of the magazine and movable to a second position for releasing the elements to provide for a transfer of cards through the mouth of the magazine, at least a second member disposed in a first position relative to the mouth of the magazine to inhibit the transfer of cards through the mouth and movable to a second position relative to the mouth of the magazine to provide for a transfer of cards through the mouth of the magazine, and means operative upon the first and second members for obtaining a concurrent movement of the first and second members to the first positions at first particular times and for obtaining a concurrent movement of the first and second members to the second positions at second particular times.

17. The combination set forth in claim 11 in which the retractable means includes at least one finger-like member disposed relative to the magazine means to facilitate the retention of the storage elements within the magazine upon the withdrawal of the magazine from the particular position on the supporting means.

18. In combination for use in apparatus for processing data on a plurality of information storage cards, a magazine having a mouth and constructed to hold the information storage cards in a stacked relationship and to provide for a transfer of the cards in the plurality through the mouth of the magazine; means including at least one card-retaining member mounted in the magazine between a retracted position for movement, in a direction transverse to the disposition of the cards in the magazine, relative to the mouth of the magazine to facilitate the transfer of cards through the mouth of the magazine and a position in which the retaining member protrudes outwardly from the magazine to inhibit the transfer of cards through the mouth of the magazine, means operatively coupled to the card-retaining member for biasing the member to the protruding position, and means operatively coupled to the card-retaining member for moving the card-retaining member to the retracted position against the action of the biasing means.

19. In combination for use in apparatus for processing data on a plurality of information storage cards, a magazine constructed to hold the cards in the plurality in stacked relationship and provided with a mouth to obtain a transfer of cards into and out of the magazine, first means biased to a first position against the lateral extremities of the cards in the magazine to inhibit the transfer of cards in the plurality from the magazine and to inhibit the transfer of cards in the plurality into the magazine through the mouth of the magazine and movable to a second position away from the lateral extremities of the cards in the magazine to provide for a transfer of cards into and out of the magazine through the mouth of the magazine, second means biased to a position in front of the magazine to inhibit the transfer of cards in the plurality into and out of the magazine through the mouth of the magazine and movable to a second position to obtain a transfer of the cards in the plurality into and out of the magazine through the mouth of the magazine, and means operatively coupled to the first and second biased means to obtain a concurrent movement of the first and second biased means to the second positions.

20. In combination for use in apparatus for processing data on a plurality of information storage cards, a magazine constructed to hold the cards in the plurality in stacked relationship and provided with a mouth to obtain a transfer of cards into and out of the magazine, transport means for the cards and disposed relative to the mouth of the magazine in a particular position to provide for a transfer of cards between the transport means and the magazine through the mouth of the magazine, first means disposed in the magazine and biased to a first position relative to the lateral extremities of the cards in the magazine to inhibit the transfer of cards into and out of the magazine through the mouth of the magazine and movable to a second position away from the lateral extremities of the cards in the magazine to provide for a transfer of cards between the transport means and the magazine through the mouth of the magazine, second means biased to a first position relative to the faces of the cards in the magazine and relative to the mouth of the magazine to inhibit the transfer of cards in the plurality into and out of the magazine through the mouth of the magazine and movable to a second position relative to the faces of the cards in the magazine and relative to the mouth of the magazine to provide for a transfer of cards into and out of the magazine through the mouth of the magazine, and means operatively coupled to the first and second biased means for obtaining a concurrent disposition of the first and second biased means in the second positions upon the disposition of the magazine in the particular position relative to the transport means.

21. In apparatus for processing data on a plurality of information storage cards, the combination of: transport means for the cards, a removable magazine having a mouth and constructed to hold the information storage cards in a stacked relationship, supporting means operatively coupled to the magazine for holding the magazine at a particular position thereon with the mouth of the magazine facing the transport means so that cards may be transferred through the mouth of the magazine between the magazine and the transport means, at least one card-retaining slide member mounted in the magazine adjacent the mouth thereof to be movable between a first position in which the slide member protrudes outwardly from the magazine and a retracted position, means coupled to the card retaining slide member for biasing the same to its first position, and means positioned on the supporting means for engaging the card-retaining slide member to obtain a disposition of the slide member in its retracted position with respect to the magazine when the magazine is in said particular position, the card retaining slide member including a shoulder displaced from the extremity thereof to be engaged by the engaging means for the slide member with the inner edge of the portion of the retaining member between the shoulder and the extremity serving as a guide for the cards when the retaining slide member is moved to its retracted position.

22. In apparatus for processing data on a plurality of information storage cards, the combination of: transport means for the cards, a removable magazine having a mouth and constructed to hold the information storage cards in a stacked relationship, supporting means operatively coupled to the magazine for holding the magazine at a particular position thereon with the mouth of the magazine facing the transport means so that cards may be transferred through the mouth of the magazine between the magazine and the transport means, at least one card-retaining slide member mounted in the magazine adjacent the mouth thereof to be movable between a first position in which the slide member protrudes outwardly from the magazine and a retracted position, means coupled to the card retaining slide member for biasing the same to its first position, and means positioned on the supporting means for engaging the card-retaining slide member to obtain a disposition of the slide member in its retracted position with respect to the magazine when the magazine is in said particular position, the means for engaging the slide member being constructed for engagement with the magazine upon the movement of the magazine on the supporting means to position the magazine at said particular position.

References Cited in the file of this patent

UNITED STATES PATENTS

| | | |
|---|---|---|
| 2,731,910 | Gruver | Jan. 24, 1956 |
| 2,792,223 | Klippel | May 14, 1957 |
| 2,842,363 | Leavens | July 8, 1958 |
| 2,898,104 | Fiehl | Aug. 4, 1959 |